Oct. 3, 1944. L. L. WOOD 2,359,703
STEREOSCOPIC APPARATUS
Filed Aug. 24, 1943
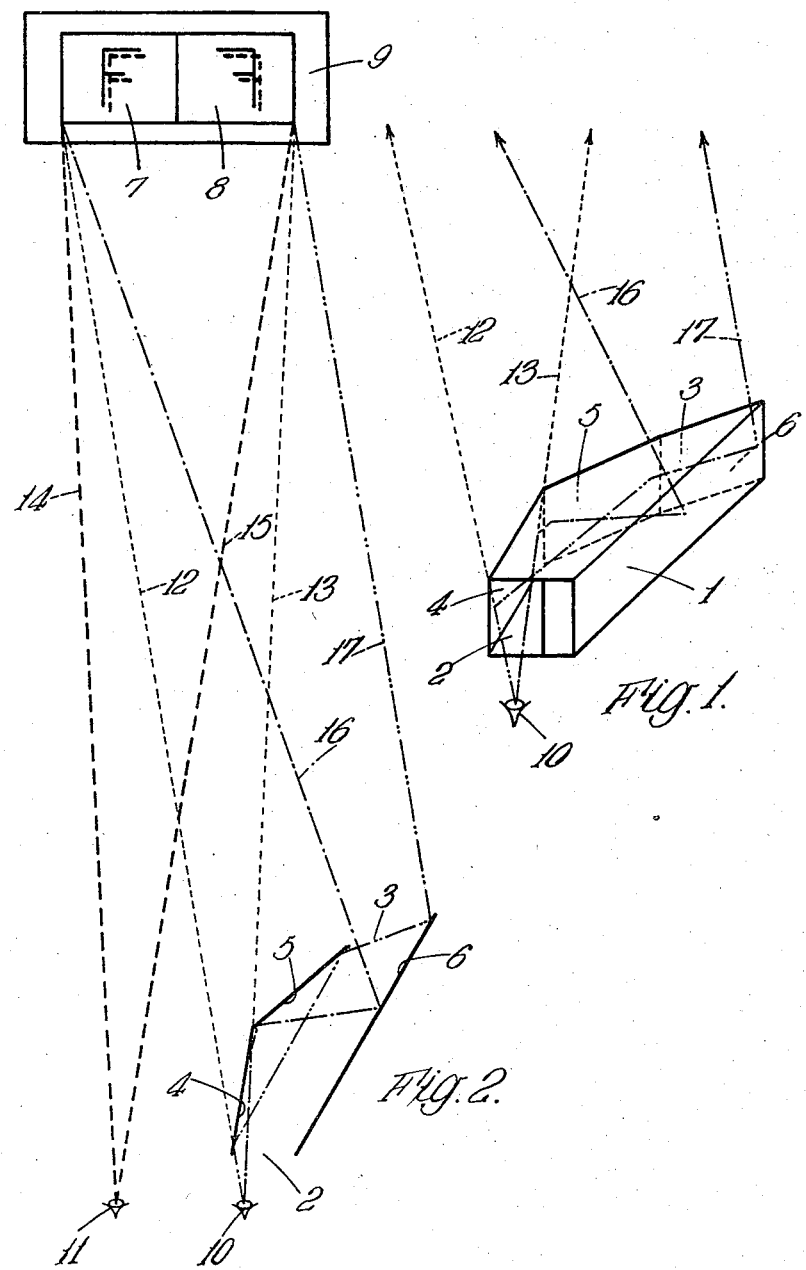
INVENTOR
Luis Ley Wood
By Bailey, Stephens & Huettig
ATTYS Patented Oct. 3, 1944

2,359,703

UNITED STATES PATENT OFFICE 2,359,703

STEREOSCOPIC APPARATUS

Luis Ley Wood, Las Palmas, Canary Islands

Application August 24, 1943, Serial No. 499,839
In Spain August 5, 1942

3 Claims. (Cl. 88—29)

In the specification of British Letters Patent No. 505,602, granted to me are described a stereoscopic picture comprising two views, as seen by the left and right eyes respectively, mounted side by side, one of said views being laterally inverted with respect to the other of said views; there are also described means for producing such a stereoscopic picture; further it is stated in said specification that when such a picture is viewed by both eyes, before one of which is disposed a device for effecting lateral inversion, the two views may be caused to appear in superposition, each on the other, with stereoscopic effect. The object of the present invention is an improved lateral inversion device for that purpose.

To this end and according to the present invention the improved lateral inversion device has therein three or a greater odd number of reflecting surfaces which may be constituted by suitably arranged mirrors or the like or may be presented by the suitably arranged faces of one or more total reflection prisms, or by a combination thereof.

These mirrors and/or prisms may be disposed within a casing having openings at its opposite ends and for convenience one form of the improved device is illustrated by the accompanying drawing in which Figure 1 is a perspective view of a device embodying the principles of the invention and in which Figure 2 is a diagrammatic plan view of the device shown in relation to a diagrammatic representation (corresponding to that shown in Figure 1 of the drawing accompanying British specification No. 505,602) illustrating how a stereoscopic picture may be viewed.

As shown the device comprises a suitably shaped casing 1 of metal, wood, or moulded plastic material having openings 2 and 3 at its opposite ends and enclosing a prism having three total reflection surfaces at 4, 5 and 6. A stereoscopic picture consists of two prints 7 and 8 mounted side by side on a support 9 and representing the view seen by the right and left eyes 10 and 11 respectively, the print 8, however, having been laterally inverted. If now the lateral inversion device of the present invention be held in front of the right eye 10 only, in such a position that direct sight of the stereoscopic picture by said right eye 10 be prevented (see the broken lines 12, 13), but the left eye 11 sees the prints 7 and 8 normally (see the broken lines 14, 15), the right eye 10 will see the prints laterally inverted as indicated by the broken lines 16, 17 which show how reflection takes place at the surfaces 6, 5 and 4 before reaching the eye 10, so that the object shown in the print 8 appears to be superimposed on the object shown in the print 7 as seen by the left eye 11, while the object shown in the print 7 is similarly seen superposed on the object shown in the print 8. This superposition is indicated in full and dotted lines in Figure 2, but, for explanatory purposes, the full and dotted representations are displaced relatively to one another. However, the superposed images do not coincide exactly since they represent the views normally seen by the separate eyes and in this way the stereoscopic effect is obtained.

If desired, the surfaces 4, 5 and 6 in the casing 1 may be mere mirrors, in which event it is desirable that the openings 2 and 3 should be closed by glass or other suitable transparent material, to exclude dust. If however a prism or a combination of prisms be employed, there is less risk of reflection being impaired by the entry of dust into the casing.

I claim:

1. Stereoscopic apparatus for viewing a stereoscopic picture which consists of two views as seen by the left and right eyes respectively, mounted side by side and one of said views being laterally inverted with respect to the other; said stereoscopic apparatus comprising a casing having two openings one at each of the opposite ends thereof, one of said openings adapted to be applied to one eye only, the other eye to view the picture through another light path, an odd number of reflecting surfaces greater than one, disposed within said casing and arranged in opposed inclined relationship, one of said reflecting surfaces being situated near one end of said apparatus and adapted to reflect an incident ray from the stereoscopic picture to another of said reflecting surfaces, whence it passes by reflection to another of said reflecting surfaces, which is situated near the other end of said apparatus and is adapted to reflect said ray to the eye of the observer.

2. Stereoscopic apparatus for viewing a stereoscopic picture which consists of two views as seen by the left and right eyes respectively, mounted side by side and one of said views being laterally inverted with respect to the other; said stereoscopic apparatus comprising a casing having two openings one at each of the opposite ends thereof, one of said openings adapted to be applied to one eye only, the other eye to view the picture through another light path, three reflecting surfaces in said casing arranged in opposed inclined relationship, two of said surfaces disposed at an obtuse angle with each other and upon one side of a line joining the two openings in the casing, the third surface disposed upon the opposite side of said line, said third surface adapted to reflect an incident ray from the stereoscopic picture to one of the first two surfaces, whence said ray passes to the other of said two surfaces, which last named surface is adapted to reflect said ray to the eye of the observer.

3. Stereoscopic apparatus as set forth in claim 2 in which the reflecting surfaces in the casing are comprised by the total reflecting surfaces of a prism having at least five sides, providing the three reflecting surfaces and means whereby the rays enter and leave the prism respectively.

LUIS LEY WOOD.